(12) United States Patent
Starr

(10) Patent No.: US 10,491,438 B2
(45) Date of Patent: Nov. 26, 2019

(54) SYSTEMS AND METHODS FOR REINFORCING SIGNALS ON COUPLED CHANNELS DURING IDLE PERIODS

(71) Applicant: AT&T Intellectual Property I, L.P., Atlanta, GA (US)

(72) Inventor: Thomas Starr, Barrington, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 55 days.

(21) Appl. No.: 15/582,900

(22) Filed: May 1, 2017

(65) Prior Publication Data

US 2018/0316529 A1 Nov. 1, 2018

(51) Int. Cl.
| | |
|---|---|
| *H04L 27/26* | (2006.01) |
| *H04W 72/12* | (2009.01) |
| *H04B 7/26* | (2006.01) |
| *H04L 29/06* | (2006.01) |
| *H04W 84/14* | (2009.01) |
| *H04L 25/14* | (2006.01) |

(52) U.S. Cl.
CPC ......... *H04L 27/261* (2013.01); *H04B 7/2637* (2013.01); *H04L 25/14* (2013.01); *H04L 29/06* (2013.01); *H04L 69/28* (2013.01); *H04W 72/1226* (2013.01); *H04W 84/14* (2013.01)

(58) Field of Classification Search
None
See application file for complete search history.

(56) References Cited

U.S. PATENT DOCUMENTS

| | | |
|---|---|---|
| 3,898,390 A | 8/1975 | Wells et al. |
| 4,144,411 A | 3/1979 | Frenkiel |
| 4,144,496 A | 3/1979 | Cunningham et al. |
| 5,313,461 A | 5/1994 | Ahl et al. |
| 5,491,837 A | 2/1996 | Haartsen |
| 5,579,373 A | 11/1996 | Jang |
| 6,011,970 A | 1/2000 | McCarthy |
| 6,990,362 B2 | 1/2006 | Simpson et al. |
| 7,020,809 B2 | 3/2006 | Kleppel et al. |
| 7,313,123 B2 | 12/2007 | Haartsen |
| 8,073,452 B2 | 12/2011 | Kossi et al. |
| 8,081,997 B2 | 12/2011 | Sambhwani et al. |
| 8,953,506 B2 | 2/2015 | Sohrabi |

(Continued)

FOREIGN PATENT DOCUMENTS

| | | |
|---|---|---|
| CA | 1061412 A | 8/1979 |
| CN | 101453438 B | 5/2011 |

(Continued)

OTHER PUBLICATIONS

Gao et al.; "Cooperative Wireless Energy Harvesting and Spectrum Sharing in 5G Networks"; IEEE Special Section on Green Comm. and Networking for 5G Wireless; vol. 4; 2016; p. 3647-3658.

(Continued)

*Primary Examiner* — Candal Elpenord
(74) *Attorney, Agent, or Firm* — BakerHostetler

(57) ABSTRACT

A method for reinforcing signals on coupled channels during idle periods transmits a first signal on a destination channel and a second signal on a source channel. The second signal is formulated to produce an optimal signal coupled into the destination channel to reinforce the first signal and is sent during idle periods in the source channel.

17 Claims, 4 Drawing Sheets

(56) References Cited

U.S. PATENT DOCUMENTS

| | | |
|---|---|---|
| 9,363,705 B2 | 6/2016 | Campos et al. |
| 2008/0025266 A1* | 1/2008 | Tynderfeldt ......... H04B 7/2653 |
| | | 370/337 |
| 2008/0165718 A1* | 7/2008 | Colak ................... H04B 1/711 |
| | | 370/315 |
| 2012/0327986 A1* | 12/2012 | Schenk ................... H04B 3/32 |
| | | 375/222 |
| 2014/0273873 A1* | 9/2014 | Huynh ................... H04B 17/29 |
| | | 455/67.12 |
| 2015/0063151 A1 | 3/2015 | Sadek et al. |
| 2015/0304964 A1 | 10/2015 | Larsson et al. |

FOREIGN PATENT DOCUMENTS

| | | |
|---|---|---|
| WO | WO 2008/071129 A1 | 6/2008 |
| WO | WO 2014/100974 A1 | 7/2014 |

OTHER PUBLICATIONS

Wang et al.; "Dynamic Channel Assignment in Wireless LANs"; IEEE Workshop on Power Electronics and Intelligent Transportation System; 2008; p. 12-17.

Ghosh et al.; "Throughput and Energy Efficiency of a Cooperative Hybrid ARQ Protocol for Underwater Acoustic Sensor Networks"; Sensors; vol. 13; 2013; p. 15385-15408.

\* cited by examiner

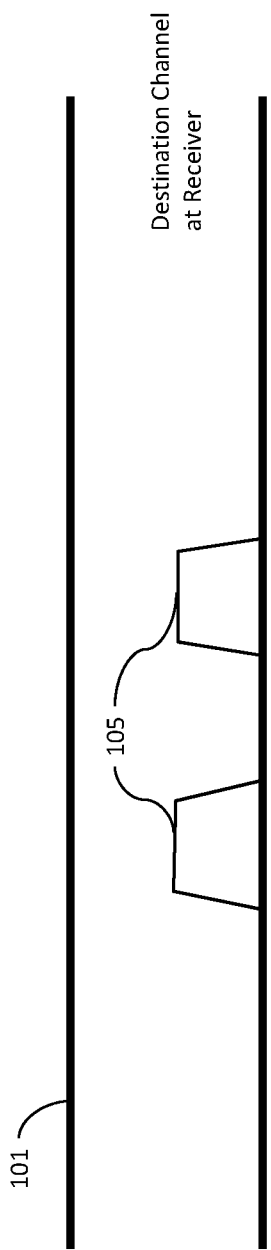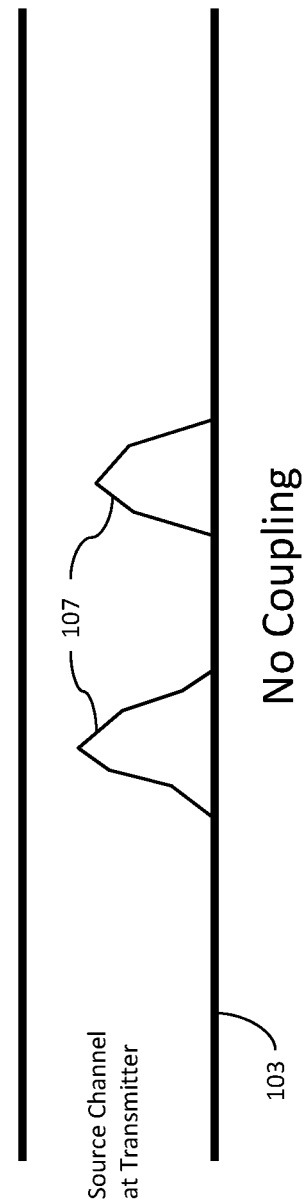

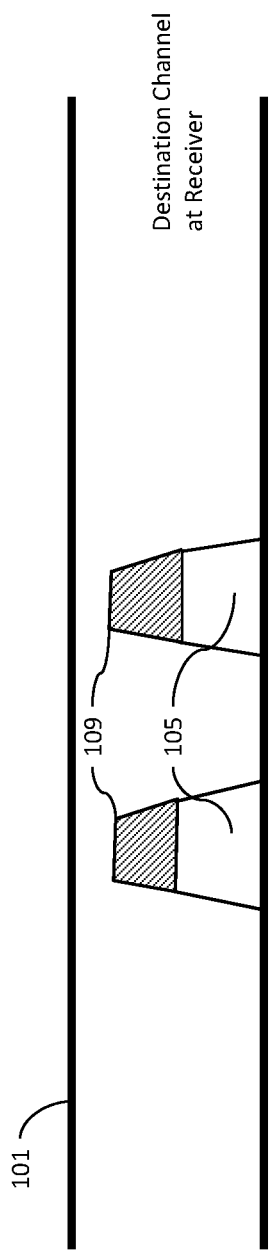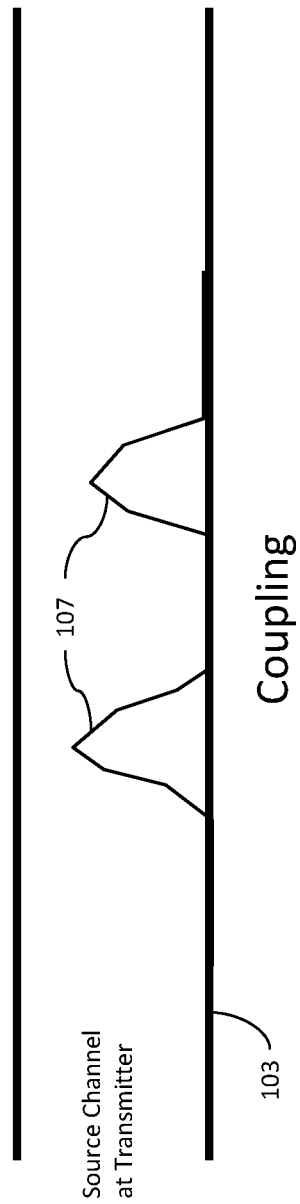

SYSTEMS AND METHODS FOR REINFORCING SIGNALS ON COUPLED CHANNELS DURING IDLE PERIODS

TECHNICAL FIELD

The disclosure relates generally to systems and methods for transmitting signals from a transmitter to a receiver via a transmission channel of limited bandwidth, and more particularly to systems and methods for reinforcing signals from coupled channels during idle periods.

BACKGROUND

Transmission on wired, fiber optic, and wireless channels is limited by the signal power received via the direct channel and the noise present on the channel. A "channel" may be a pair of wires in a multi-pair cable, a radio frequency band, or signals transmitted to or from one of several radio antennas.

Crosstalk is a phenomenon by which a signal transmitted on one channel of a transmission system creates an effect in another channel. Crosstalk is usually caused by undesired capacitive, inductive, or conductive coupling from one channel to another. Vectoring is an active technology that cancels crosstalk between signals travelling down nearby copper pairs. The existing practice of vectoring can reduce the effects of far end crosstalk by adding a pre-coded component to the signal on other channels, but the pre-coded component does not increase the desired signal on the destination channel (the channel targeted for a performance boost).

Multiple-input and multiple-output, or MIMO is a method for multiplying the capacity of a radio link using multiple transmit and receive antennas to exploit multipath propagation. The existing practice of MIMO transmission can boost the signal received in a destination channel by sending coordinated signals on multiple channels, but it requires the added complexity of having multiple receivers.

Also, the reinforcing signals may also be transmitted on unused, coupled channels where the crosstalk into the destination channel would boost the desired signal, however exploiting only unused channels is limited by the number of available channels, the degree of coupling to the destination channel, and the added complexity of requiring additional transmitters to send the reinforcing signals on the spare line.

Channel bonding is a practice commonly used in IEEE 802.11 implementations in which two adjacent channels within a given frequency band are combined to increase throughput between two or more wireless devices. The existing practice of channel bonding achieves higher performance by sending a portion of the payload on each of several channels, however this comes at the cost of occupying multiple channels and requiring the complexity of additional transmitters and receivers.

There is a need to provide higher bit-rates while avoiding the complexity of needing additional transmitters or receivers when there are no unused (spare) channels.

SUMMARY

One general aspect includes a method including: transmitting a first signal on a destination channel, and transmitting a second signal on a source channel coupled to the destination channel where the second signal is formulated to produce an optimal signal coupled into the destination channel to reinforce the first signal.

Implementations may include one or more of the following features. The method where transmitting the second signal includes transmitting the second signal during an idle period in the source channel. The method where the second signal is a replica of the first signal modified in phase and amplitude as a function of frequency. The method where the second signal is based on coupling characteristics between the source channel and destination channel. The method further including sending training signals on the source channel to determine coupling characteristics between the source channel and the destination channel. The method further including transmitting a third signal on a second source channel where the third signal is formulated to produce an optimal signal coupled into the destination channel to reinforce the first signal. Other embodiments of this aspect include corresponding computer systems, apparatus, and computer programs recorded on one or more computer storage devices, each configured to perform the actions of the methods.

One general aspect includes a system including: a processor, a computer-readable medium in communication with the processor where the processor is configured to execute an application stored in the computer-readable medium for performing operations including. The system also includes transmitting a first signal on a destination channel. The system also includes transmitting a second signal on a source channel coupled to the destination channel where the second signal is formulated to produce an optimal signal coupled into the destination channel to reinforce the first signal.

One general aspect includes a non-transitory computer readable medium including computer executable instructions embodied in a computer readable medium and when executed by a processor of a computer performs steps including: transmitting a first signal on a destination channel, and transmitting a second signal on a source channel coupled to the destination channel where the second signal is formulated to produce an optimal signal coupled into the destination channel to reinforce the first signal.

BRIEF DESCRIPTION OF THE DRAWINGS

FIG. 2 A-2 B illustrate a signal that is transmitted through the destination channel at the receiver and a signal that is transmitted through the source channel and a transmitter where there is no coupling.

FIG. 3 A-3 B illustrates the effect of coupling on a signal transmitted through the destination channel at the receiver.

DETAILED DESCRIPTION OF ILLUSTRATIVE EMBODIMENTS

Transmission systems often have periods of time where no user data is being sent in a channel. A "channel" may be a pair of wires in a multi-pair cable, an optical fiber, free-space light, a radio frequency band, or signals transmitted to or from one of several radio antennas. During the idle periods, traditional systems typically transmit an idle pattern, dummy symbols, send no signal, or it enter a low-power mode where little or no signal is sent. During these idle periods a source channel may be used to transmit a signal formulated to produce the optimal signal coupled into the destination channel to reinforce the destination channel's direct signal. The transmitted reinforcing signal may be a replica of the destination channel's direct signal modified in phase, and amplitude as a function of frequency based on coupling characteristics between the respective channels which was previously learned via training signals sent on the source channel(s).

Transmissions during idle periods of more than one source channel can be employed to boost the total signal received on the destination channel. The reinforcing signals may be transmitted on multiple channels to produce a greater cumulative boost in the destination channel, or the timing of the reinforcing transmissions from the multiple source channel may be coordinated so as to produce a more stable and continuous degree of reinforcement over time. The stability of signal reinforcement can also be improved by choosing which source channels to use based on the amount of traffic on each channel and also by adjusting the timing of transmission on the source and destination channels.

Figure 1A:
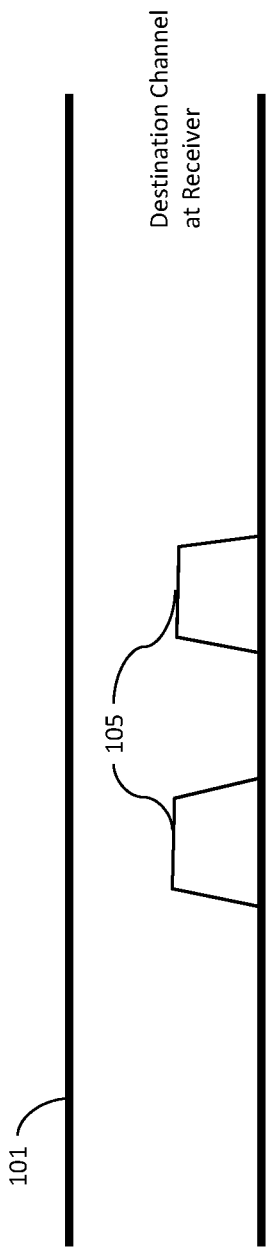
FIG. 1 A-1B illustrate a signal that is transmitted through the destination channel at the receiver.
Figure 1B:
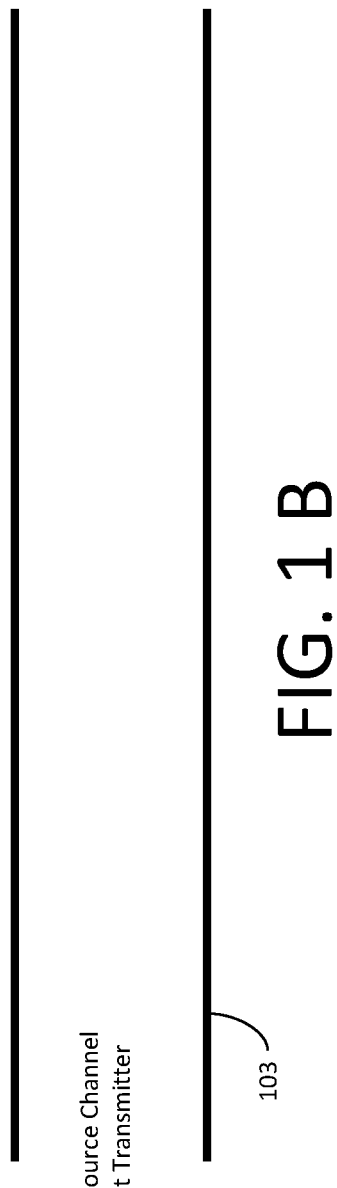

Illustrated in FIGS. 1 A and 1 B are a source channel 101 and a destination channel 103. FIG. 1 A illustrates a signal 105 in the destination channel at the receiver end. The source channel at the transmitter end shows that no signal is being transmitted through the source channel.

Illustrated in FIGS. 2 A and 2 B are the destination channel 101 through which the signal 105 is transmitted. The source channel 103 illustrates a reinforcing signal 107 without the coupling effect on the signal at the destination channel 101.

FIGS. 3 A and 3 B illustrate the reinforcement effect 109 that the reinforcing signal 107 through the source channel 105 has on the signal 105.

Figure 4:
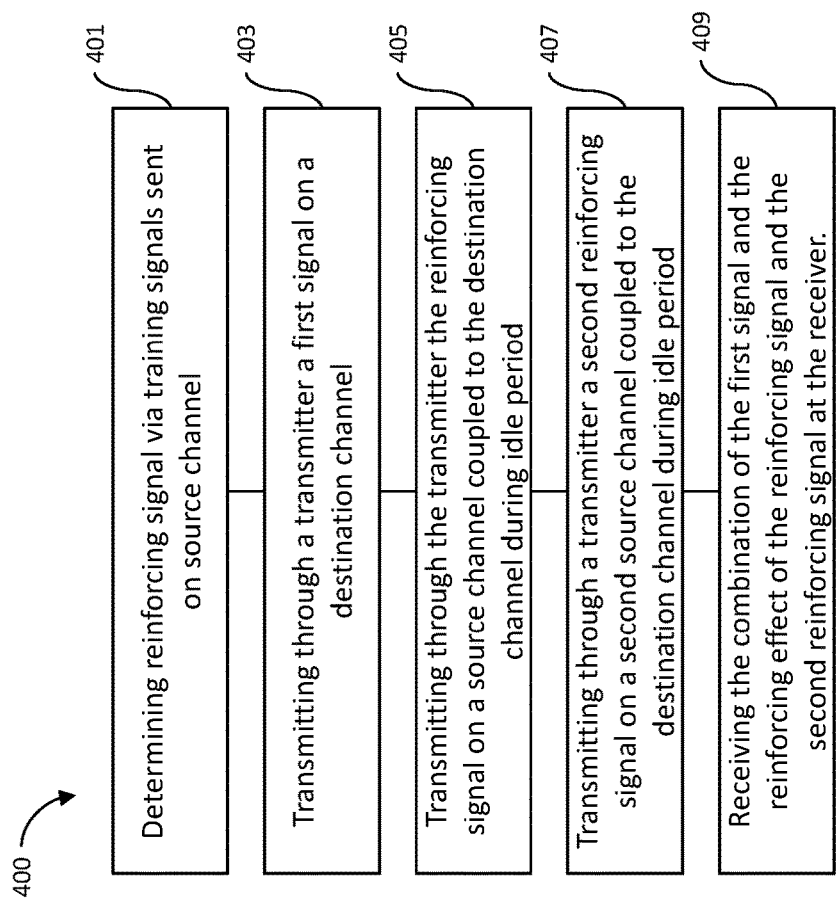
FIG. 4 is a flowchart of an embodiment of a method for reinforcing signals from coupled channels during idle periods.

Any number of source channels may be used to provide the reinforcing effect. Illustrated in FIG. 4 is a flowchart of a method 400 for reinforcing signals on coupled channels during idle periods. The method 400 may be employed in channels which also are performing vectored transmission to cancel crosstalk.

In step 401 the method 400 determines the reinforcing signal via training signals sent on the source channel. The reinforcing signal may be a replica of the destination channel's direct signal modified in phase, and amplitude as a function of frequency based on coupling characteristics between the respective channels.

In step 403 the method 400 transmits through a transmitter a first signal on the destination channel.

In step 405 the method 400 transmits through the transmitter the reinforcing signal on a source channel coupled to the destination channel.

In step 407 the method 400 may transmit a second reinforcing signal on a second source channel coupled to the destination channel. The second reinforcing signal may be transmitted on source channels that are not in service, or during idle periods of source channels that are in service. Selection of the second source channel may be made based on the timings of the data bursts on the respective channels, i.e. choose a source channel which is transmitting at the right time. The timing of sending data on the second source channel or the destination channel may be adjusted so as to better align the signal reinforcement. If the source channel has very high signal to noise ratio margin, the source channel transmission may be pre-coded during active transmission to provide some reinforcing boost to the destination channel.

In step 409 the method 400 may receive at the receiver the combination of the first signal and the reinforcing effect of the reinforcing signal and the second reinforcing signal.

Although two source channels are described in the method above, it is contemplated that any number of channels may provide a reinforcing effect as described above.

When used in combination with forward error control (FEC) error correction such as Reed Solomon coding (block-based error correcting codes) any symbol periods where reinforcing signals are not transmitted can be marked as being more likely to have error for FEC erasure decoding. In FEC, information bits are protected against errors by the transmitting of extra redundant bits, so that if errors occur during transmission the redundant bits can be used by the decoder to determine where the errors have occurred. An erasure code is a forward error correction (FEC) code for the binary erasure channel, which transforms a message of k symbols into a longer message (code word) with n symbols such that the original message can be recovered from a subset of the n symbols.

The methods described in the examples may be embodied directly in hardware, in a software module executed by a processor, or in a combination of the two. A software module may reside in any form of memory or storage medium such as RAM memory, flash memory, ROM memory, EPROM memory, EEPROM memory, registers, hard disk, a removable disk, a CD-ROM. The memory or storage medium may be coupled to the processor such that the processor can read information from, and write information to, the memory or storage medium. Alternatively, the storage medium may be integral to the processor. The processor and the storage medium may reside in an ASIC. In some aspects, the steps and/or actions of a method may reside as one or any combination or set of codes and/or instructions on a machine readable medium and/or computer readable medium, which may be incorporated into a computer program product.

In any of the exemplary embodiments, the described functions may be implemented in hardware, software, firmware, or any combination thereof. Functions implemented in software may be stored on or transmitted over as instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed:

1. A method comprising:
   transmitting a first signal on a destination channel through a transmitter to a receiver wherein the destination channel is a first wired, first fiber-optic, or first wireless channel;
   selecting a source channel from among a plurality of alternative source channels based on timing of data bursts in each of the plurality of alternative source channels and an amount of traffic on each of the plurality of alternative source channels and wherein the source channel is performing a vectored transmission to cancel crosstalk;

formulating a second reinforcing signal to be sent on the selected source channel coupled to the destination channel by capacitive, inductive or conductive coupling, wherein the source channel is a second wired, second fiber-optic, or second wireless channel; and transmitting the second reinforcing signal, through the transmitter, on the selected source channel coupled to the destination channel by the capacitive, the inductive or the conductive coupling, wherein the second reinforcing signal reinforces the first signal through a crosstalk effect.

2. The method of claim 1 wherein transmitting the second reinforcing signal comprises transmitting the second reinforcing signal, through the transmitter on a source channel that is not in service or during an idle period in the source channel.

3. The method of claim 1 wherein the second reinforcing signal is a replica of the first signal modified in phase and amplitude as a function of frequency.

4. The method of claim 1 wherein the second reinforcing signal is based on crosstalk coupling characteristics between the source channel and the destination channel.

5. The method of claim 1 further comprising sending training signals through the transmitter on the source channel to determine coupling characteristics between the source channel and the destination channel.

6. The method of claim 1 further comprising adjusting the transmitting of the second reinforcing signal, through the transmitter, based on the source channel or the destination channel so as to better align reinforcement of the first signal.

7. A system comprising:
a processor;
a transmitter;
a receiver;
a computer-readable medium in communication with the processor wherein the processor is configured to execute an application stored in the computer-readable medium for performing operations comprising:
transmitting a first signal through the transmitter to the receiver on a destination channel, wherein the destination channel is a first wired, first fiber-optic, or first wireless channel;
selecting a source channel from among a plurality of alternative source channels based on timing of data bursts in each of the plurality of alternative source channels and an amount of traffic on each of the plurality of alternative source channels and wherein the source channel is performing a vectored transmission to cancel crosstalk; and
transmitting a second reinforcing signal through the transmitter on the selected source channel coupled to the destination channel by capacitive, inductive or conductive coupling, wherein the selected source channel is a second wired, second fiber-optic, or second wireless channel and wherein the second reinforcing signal is formulated to produce an optimal signal coupled into the destination channel to reinforce the first signal through a crosstalk effect.

8. The system of claim 7 wherein transmitting the second reinforcing signal though the transmitter comprises transmitting the second reinforcing signal through the transmitter on the source channel that is not in service or during an idle period in the source channel.

9. The system of claim 7 wherein the second reinforcing signal is a replica of the first signal modified in phase and amplitude as a function of frequency.

10. The system of claim 7 wherein the second reinforcing signal is based on crosstalk coupling characteristics between the source channel and the destination channel.

11. The system of claim 7 wherein the processor is configured to execute an application stored in a computer readable medium for performing operations further comprising sending training signals though the transmitter on the source channel to determine coupling characteristics between the source channel and the destination channel.

12. The system of claim 7 wherein the processor is configured to execute an application stored in a computer readable medium for performing operations further comprising adjusting the step of transmitting of the second reinforcing signal based on the source channel or the destination channel so as to better align reinforcement of the first signal.

13. A non-transitory computer readable medium comprising computer executable instructions embodied in a computer readable medium and when executed by a processor of a computer performs steps comprising:
transmitting a first signal through a transmitter to a receiver on a destination channel, wherein the destination channel is a first wired, first fiber-optic, or first wireless channel;
selecting a source channel from among a plurality of alternative source channels based on timing of data bursts in each of the plurality of alternative source channels and an amount of traffic on each of the plurality of alternative source channels and wherein the source channel is performing a vectored transmission to cancel crosstalk;
formulating a second reinforcing signal to be sent on the source channel coupled to the destination channel by capacitive, inductive or conductive coupling, wherein the source channel is a second wired, second fiber-optic, or second wireless channel; and
transmitting a second reinforcing signal through the transmitter on the selected source channel coupled to the destination channel by the capacitive, the inductive or the conductive coupling, wherein the second reinforcing signal reinforces the first signal through a crosstalk effect.

14. The non-transitory computer readable medium of claim 13 wherein transmitting the second reinforcing signal through the transmitter comprises transmitting the second reinforcing signal on the source channel that is not in service or during an idle period in the source channel.

15. The non-transitory computer readable medium of claim 13 wherein the second reinforcing signal is a replica of the first signal modified in phase and amplitude as a function of frequency.

16. The non-transitory computer readable medium of claim 13 wherein the second reinforcing signal is based on crosstalk coupling characteristics between the source channel and the destination channel.

17. The non-transitory computer readable medium of claim 13 comprising computer executable instructions embodied in the computer readable medium and when executed by processor of the computer performs an additional step of sending training signals though the transmitter on the source channel to determine coupling characteristics between the source channel and the destination channel.

* * * * *